United States Patent Office 2,940,336
Patented June 14, 1960

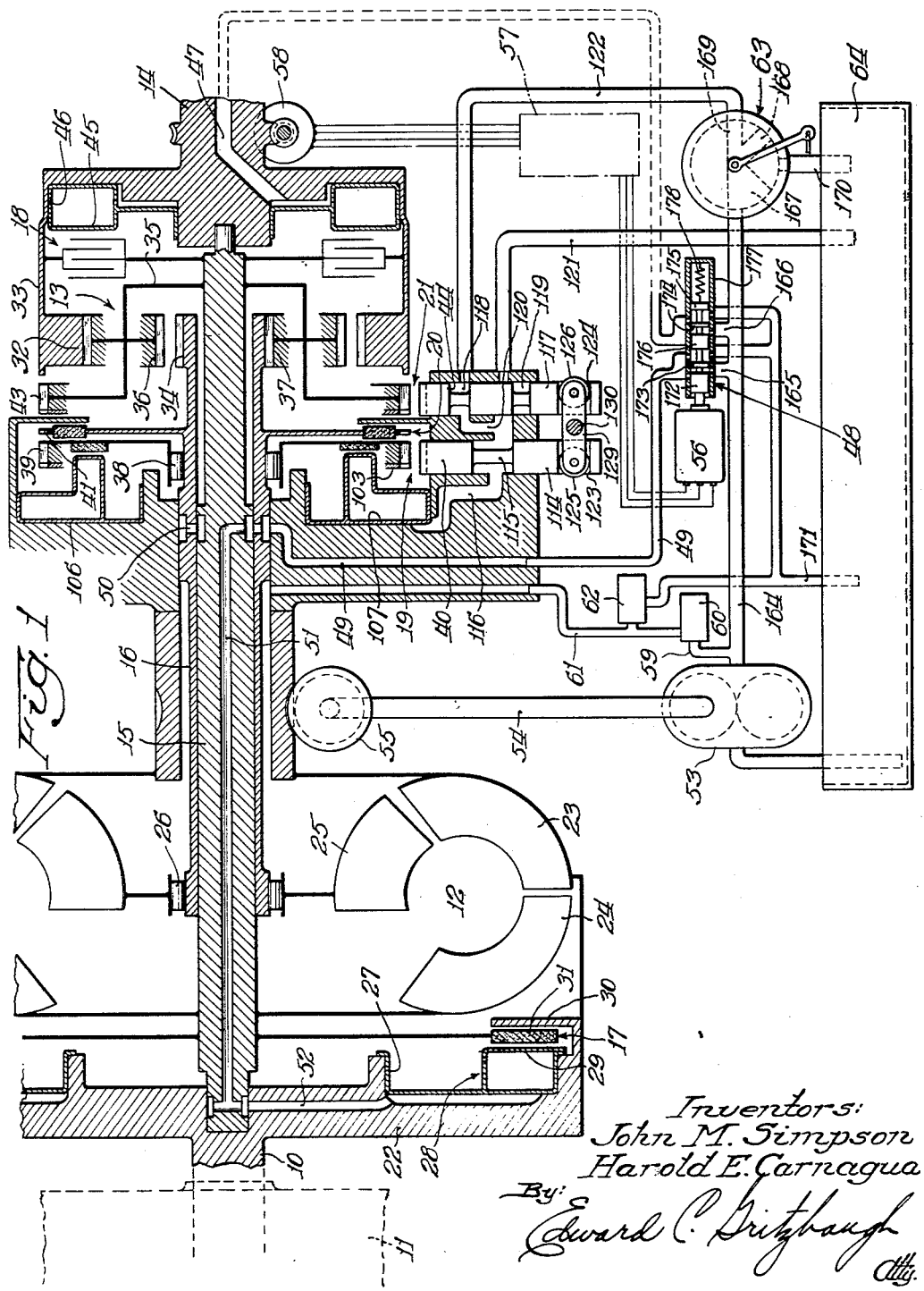

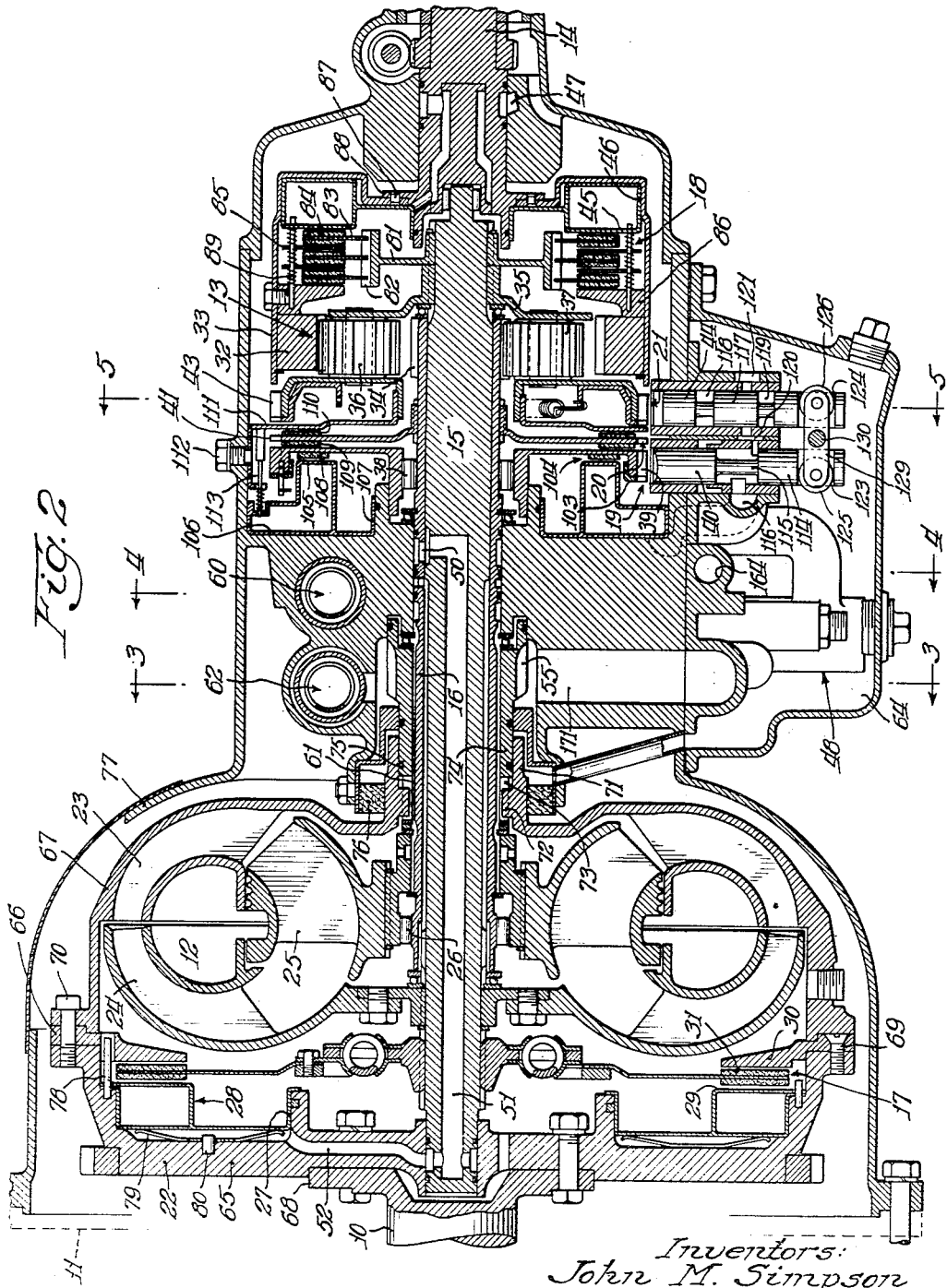

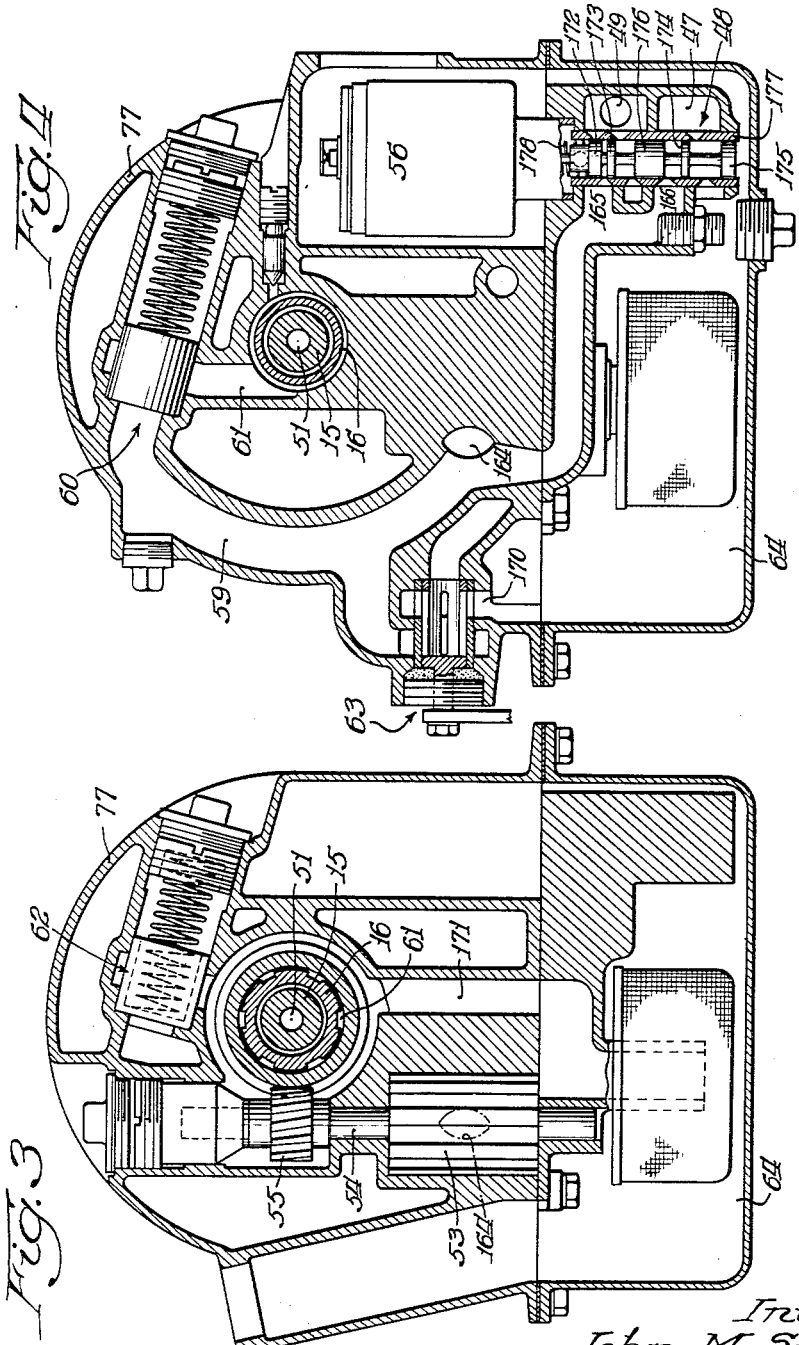

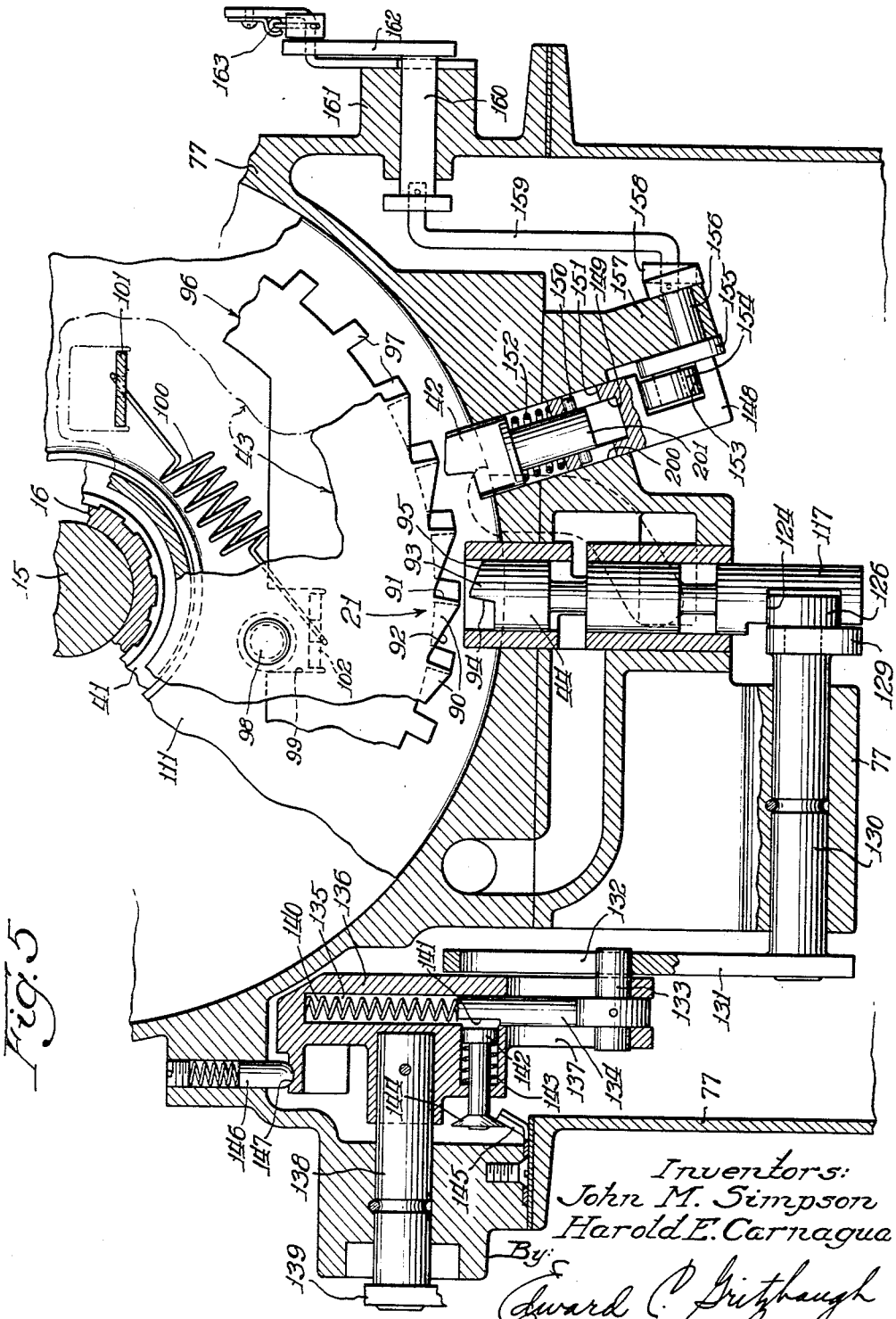

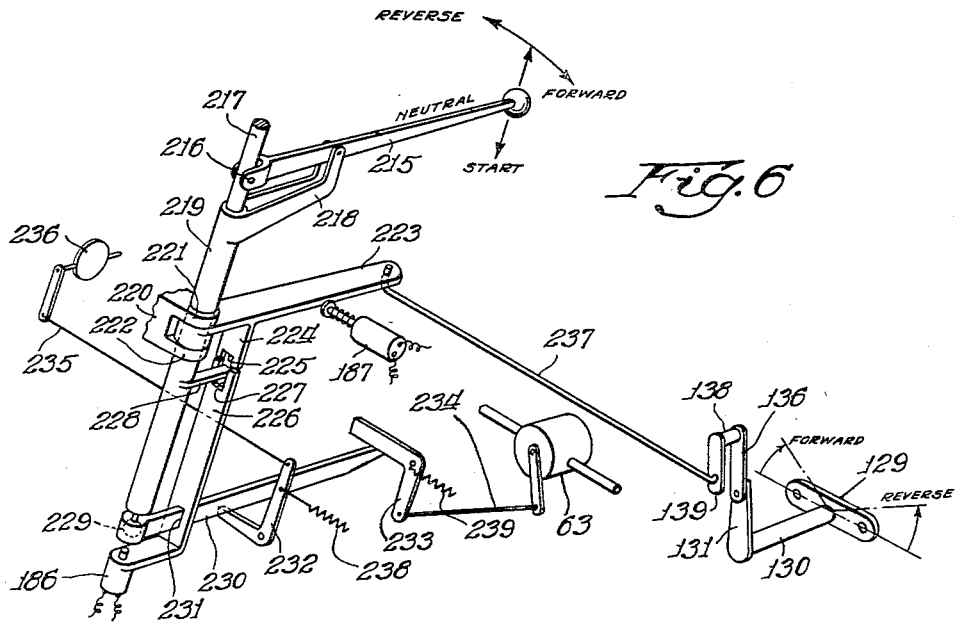
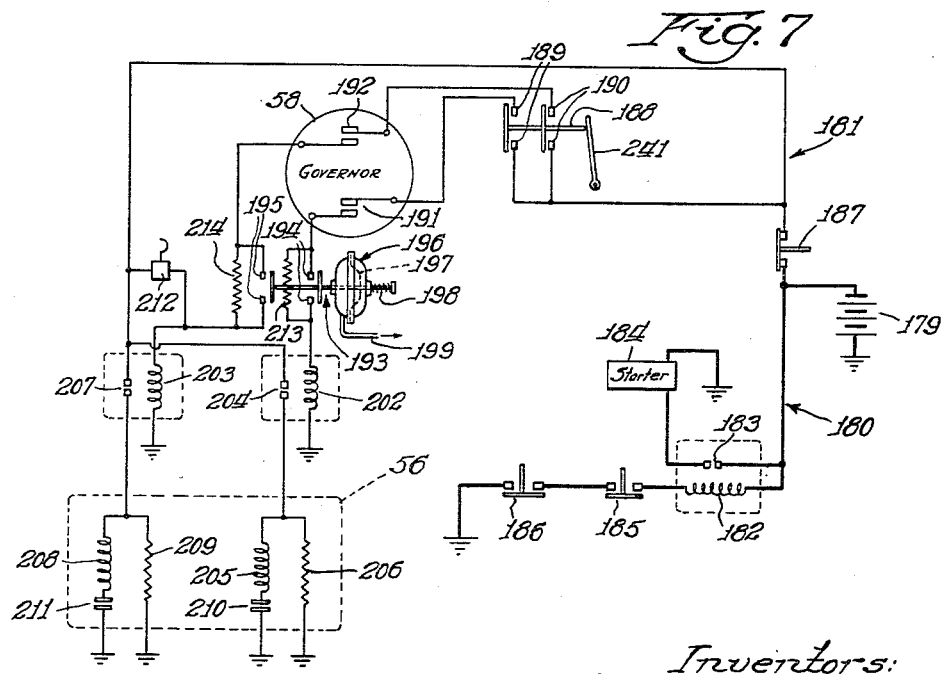

2,940,336

TRANSMISSION AND CONTROL THEREFOR

John M. Simpson, deceased, late of Asheville, N.C., by First National Bank and Trust Company, administrator, Asheville, N.C., and Harold E. Carnagua, Fort Wayne, Ind., assignors to Borg-Warner Corporation, Chicago, Ill., a corporation of Illinois Continuation of application Ser. No. 426,122, Jan. 9, 1942. This application Jan. 11, 1957, Ser. No. 633,770

60 Claims. (Cl. 74—645)

This invention relates to automatic transmissions and particularly to that type of transmission which employs a hydraulic torque converter combined with gearing.

This application is a continuation of the application of John M. Simpson et al., filed January 9, 1942, S.N. 426,122, now abandoned for Transmission and Control Therefor.

The principal object of this invention is to provide an improved automatic transmission of the hydrodynamic type combined with gearing which will be simpler and more efficient than those heretofore proposed.

Another object of this invention is to provide an automatic transmission of the hydrodynamic type combined with gearing wherein manually operated positive types of controls are used for low and reverse drives for greatest efficiency, hydraulically operated controls are used for intermediate and direct drives, and electrical means are used to control the hydraulic controls for greatest simplicity.

Another object of this invention is to provide a transmission of the hydrodynamic type combined with gearing wherein a common releasable reaction is used for both the gearing and hydrodynamic device, with means for releasing the hydrodynamic device from the reaction independently of the gearing.

A more specific object of this invention is to provide a lockup mechanism for a hydrodynamic torque converter which is extremely light so as to reduce to a minimum the rotational inertia of the fly wheel and associated rotating parts.

Yet another specific object of this invention is to provide an automatic transmission of the hydrodynamic type combined with gearing wherein all rotatable parts are made as light as possible to facilitate fast shifting and to promote faster acceleration of the engine.

These and other objects and features of this invention will become apparent from the following specification when taken together with the accompanying drawings in which:

Fig. 1 is a schematic view of the transmission showing the mechanical features, the hydraulic circuits and the electrical controls for the hydraulic circuits;

Fig. 2 is a side elevation in section of the transmission showing a typical arrangement of the parts;

Fig. 3 is a section taken through the transmission along line 3—3 of Fig. 2;

Fig. 4 is a second section taken through the transmission along line 4—4 of Fig. 2;

Fig. 5 is a fragmentary section somewhat enlarged taken approximately along line 5—5 of Fig. 2;

Fig. 6 is a schematic diagram of the external controls for the transmission; and Fig. 7 is a wiring diagram showing the electrical controls for the transmission.

In general, the preferred embodiment of the transmission is comprised of a hydrodynamic torque converter of the three-element type comprising a pump, a turbine and a stator combined with a single planetary gear set in such a manner as to obtain two torque-converting driving ranges and a purely mechanical direct drive. Reverse is obtained through the converter rather than by means of the gearing, the functions of the stator and turbine elements being interchanged to secure this result. The pump element of the torque converter is permanently secured to the fly wheel of the engine and a definite neutral is obtained by releasing all clutches and brakes so that there is no direct connection between the driving and driven elements, nor is there any point against which the driving element can react. A positively interengageable device, manually operated, is used to provide a reaction point for forward drive on starting out, and this device remains engaged regardless of the speed at which the vehicle is moving or the engine is rotating.

Another positively interengageable manually controlled device is used for securing a reverse drive and this device likewise remains engaged as long as the transmission is conditioned for reverse. A third positively interengageable device, manually controlled, is provided when it is desired to start the engine by pushing the vehicle. A clutch is used to lock up the hydrodynamic torque converter, and another clutch is used to lock up the planetary gear set. The lock-up clutch, as well as the brake means and direct-drive clutch, are all made of stampings or lightweight castings to reduce rotational inertia to a minimum. The transmission is operated in such a manner that it will start with both the torque converter and a planetary gearing multiplying torque and at some predetermined speed, as for example, twelve miles per hour, both the torque converter and the gearing will be simultaneously conditioned to lock up. The locking up may be delayed by means of a vacuum-operated switch which remains open until the accelerator pedal is released to increase the vacuum. If the accelerator pedal is maintained continuously depressed above a speed of, say, thirty miles per hour, the torque converter will automatically lock up despite the fact that the vacuum-operated switch is still open, but the gearing will still multiply torque until the accelerator pedal is released. Between twelve and thirty miles per hour a simultaneous downshift may be effected in both the torque converter and the gearing. Above thirty miles per hour a downshift is possible only in the gearing since at speeds above thirty miles per hour the torque converter would have no torque multiplying characteristics and hence would not contribute anything to the acceleration of the vehicle.

Referring now to the drawings for a detailed description of the invention and particularly to Fig. 1, the transmission is comprised of a drive shaft 10, which may be connected to a prime mover such as internal combustion engine 11, a hydraulic torque converter 12, a planetary gear set 13 and a driven shaft 14. The torque converter 12 is connected to gearing 13 by means of a shaft 15 and also by means of a concentric hollow shaft 16. A lock-up clutch 17 is used to obtain a mechanical drive through the front end of the transmission around converter 12, a multiplate friction clutch 18 is used to lock up planetary gear set 13, and three brakes of the positive type 19, 20 and 21 serve as forward, push start and reverse controls for the transmission.

Attached to drive shaft 10 is a housing 22 to which is secured pump element 23 of torque converter 12. Said torque converter is comprised of a turbine element 24 connected to shaft 15 and a stator 25 connected to hollow shaft 16 through a roller-and-cam device 26 which during forward drive functions as a one-way brake and during reverse drive functions as a clutch. Within housing 22 is an annular cylinder 27 in which is slidably, but not rotatably, received an annular piston 28 having a pressure transmitting member 29 secured thereto. Housing 22 is also provided with an inwardly extending flange 30 spaced from pressure transmitting member 29. Within the space between flange 30 and member 29 is a friction plate 31 which is secured to rotate with shaft 15. It will be observed that when piston 28 is moved to the right (Fig. 1) so as to clamp friction plate 31 against flange 30, drive shaft 10 will be directly and mechanically connected to shaft 15, thereby locking up torque converter 12.

Planetary gear set 13 is comprised of a ring gear 32 secured to a drum 33 which is rotatable with driven shaft 14, a sun gear 34 mounted for rotation with hollow shaft 16, a carrier 35 mounted on shaft 15 so as to be rotatable therewith and a plurality of double planet pinions 36 and 37 mounted on carrier 35. Said planet pinions are so arranged that a pinion 36 will mesh with ring gear 32 and also with planet pinion 37, and said planet pinion 37 will mesh with sun gear 34.

Brake 19 is connected to hollow shaft 16 through a roller-and-cam device 38, and brake 20 is connected directly to hollow shaft 16. Brake 21, is connected to carrier 35. Brake 19 is comprised of a toothed ratchet wheel 39 and a radially slidable, rotationally fixed pawl 40. Brake 20 is comprised of a ratchet wheel 41 and a radially slidable, rotationally fixed pawl 42 (Fig. 5). Brake 21 is comprised of a ratchet wheel 43 and a radially slidable, rotationally fixed pawl 44.

Clutch 18 is controlled by means of a piston 45 received in an annular cylinder 46 formed in drum 33. Said piston 45 is operated by fluid pressure introduced into cylinder 46 through a conduit 47 in which is interposed a selector valve 48. Said valve 48 is also interposed in a conduit 49 which conducts fluid under pressure through inter-connecting passage-ways 50 in hollow shaft 16, 51 in shaft 15 and 52 in fly-wheel housing 22 to annular cylinder 27 in fly-wheel housing 22. The hydraulic pressure is derived from a pump 53 which is driven through a shaft 54 from suitable gearing 55 connected directly to housing 22.

Selector valve 48 is controlled by a two-stage solenoid 56 which in turn is controlled by a suitable electrical circuit 57 from a governor 58 driven from driven shaft 14.

Neutral is obtained by releasing all clutches and brakes. This means that clutch 18 is released so as to break the connection between shaft 15 and driven shaft 14; brakes 19, 20 and 21 are released so that no reaction is provided for sun gear 34, and clutch 17 is likewise released so that any power transmitted to housing 22 is passed on to shaft 15 through torque converter 12 only.

To start the vehicle from a dead stop, brake 19 is applied and all other clutches and brakes are released. This provides a reaction for sun gear 34 through roller-and-cam device 38 which is designed to prevent reverse rotation of the sun gear. Roller-and-cam device 26 is arranged to prevent reverse rotation of stator 25 relative to hollow shaft 16 and hence, when brake 19 is applied, sun gear 34 and stator 25 are both held against reverse rotation. Torque impressed on drive shaft 10, therefore, is multiplied in hydraulic torque converter 12 and transmitted to shaft 15, from which it passes through carrier 35, ring gear 32 and drum 33 to driven shaft 14, planetary gear set 13 likewise multiplying the torque as it is received from shaft 15. It will be noted that since pump 53 is driven directly from housing 22, full hydraulic pressure is available whenever shaft 10 is rotating. No hydraulic pressure is required by the transmission for starting the car except such as is necessary in housing 22 for the operation of torque converter 12. The proper distribution of fluid under pressure to housing 22 is effected by means of a conduit 59 connected to pump 53, a pressure-regulating valve 60 which provides fluid under relatively high pressure for the operating of the various clutches and brakes, and a conduit 61 leading to housing 22, the pressure in conduit 61 being maintained at a lower value by a second pressure-regulating valve 62. When a predetermined speed of rotation of driven shaft 14 is reached, governor 58 will condition electrical circuit 57 and solenoid 56 to move valve 48 in a manner to admit fluid under pressure to both lock-up clutch 17 and clutch 18. The actual operation of solenoid 56 may be delayed, however, in accordance with the wishes of the operator as will be described hereinafter, so that if continued torque is required above a predetermined speed, the transmission will respond and provide the torque. Above a higher predetermined speed, however, regardless of torque requirements, clutch 17 is engaged to lock up torque converter 12, but clutch 18 will still remain disengaged until there is a let-up in the torque demand. When the latter condition exists, clutch 18 will likewise be engaged so that there will be a direct mechanical drive provided between drive shaft 10 and driven shaft 14 through clutch 17, intermediate shaft 15 and clutch 18. During all this time, brake 19 is applied and remains so. Stator 25, however, will rotate forwardly with the pump and turbine elements 23 and 24 respectively, just as soon as the fluid within the torque converter begins to impinge upon the backs of the vanes of the stator. The presence of the roller-and-cam device 38 makes this possible. Similarly when clutch 18 is engaged so as to cause ring gear 32, carrier 35 and sun gear 34 to rotate as a unit, such rotation will be made possible despite the continued engagement of brake 19 because roller-and-cam device 38 is designed to release the sun gear 34 when the latter tends to rotate in a forward direction.

Reverse is obtained by releasing brake 19 and engaging brake 21. This arrests the rotation of carrier 35, shaft 15 and turbine element 24 and releases sun gear 34, as well as stator element 25, for backward rotation. Under these conditions, with pump element 23 rotating in a forward direction and the turbine element 24 stationary, stator element 25 will rotate in a reverse direction, thereby rotating sun gear 34 reversely with it. This reverse rotation is transmitted through planetary gears 36 and 37 to ring gear 32 and then through drum 33 to driven shaft 14.

Just prior to the engagement of reverse brake 21, electrical circuit 57 is so conditioned that no fluid pressure can be admitted to clutches 17 and 18 so as to tend to drive two frictionally engaged elements in opposite directions simultaneously. The manner in which circuit 57 is so conditioned will be described hereinafter.

In order to start the engine by pushing the vehicle, brake 20 is applied and all other brakes and clutches are released. Said brake 20 provides a reaction for sun gear 34 which would otherwise be absent because of the releasing effect of roller-and-cam device 38. With sun gear 34 held stationary and driven shaft 14 rotated, a drive is impressed upon carrier 35 which in turn is transmitted to shaft 15 and thence because of a special feature incorporated in clutch 17 whereby said clutch is rendered operative whenever fluid pressure is absent in housing 22, said drive will be transmitted to housing 22 to rotate shaft 10 of the engine 11. Brake 20 is so designed that it will automatically release when engine 11 begins to drive.

Having thus described the principal features of the transmission and the general operation thereof, a detailed description of the mechanisms involved in the various features will now be described.

Fly wheel housing

Fly wheel housing 22 (Fig. 2) is comprised of a plurality of castings 65, 66 and 67; casting 65 being bolted directly to a flange 68 on shaft 10, and casting 66 being secured to casting 65 and to casting 67 by means of machine screws 69 and bolts 70 respectively. Casting 67 functions as a shroud for torque converter 12 and is provided with a sleeve 71 which extends rearwardly from torque converter 12. Said sleeve 71 is provided with internal teeth 72 which engage slots 73 in a pump drive gear shaft 74. Teeth 72 and slots 73 are so arranged so as to permit relative axial movement between housing 22 and drive gear 55, and also to provide an adjustment between these two elements if there should be a slight misalignment between them. The fluid within housing 22 is prevented from escaping by means of one or more piston rings 75 and also by means of a seal 76, the former being inserted between the casting 67 and shaft 74 and the latter being inserted between casting 67 and a portion of the casing 77 which surrounds and supports the transmission as a whole.

Annular piston 28 is held against rotation relative to casting 65 by means of a plurality of pins 78 which are fixed to casting 65 and pass through suitable notches in the piston. A plurality of springs 79, retained in casting 65 by means of pins 80, constantly urge piston 28 to the right (Fig. 2) to engage clutch 17. It is contemplated that sufficient pressure will be developed by springs 79 to enable clutch 17 to drive the engine for a push start.

Ratio clutch

In order to facilitate distinguishing between the lock-up clutch for the torque converter and the lock-up clutch for the planetary set, the first-mentioned clutch will be termed hereinafter the "direct drive clutch" and the latter will be termed the "ratio clutch."

The ratio clutch (Fig. 2) is comprised of a light casting 81 splined to shaft 15 and having external splines 82 which engage and drive a plurality of driving clutch plates 83. Said plates 83 are provided with friction facings 84 which engage driven discs 85 locked in an annular casting 86 secured to drum 33. Casting 86 serves as a reaction member for clutch 18. Said drum 33 may be fabricated from either a stamping or a very light casting and is riveted or otherwise secured as at 87 to a flange 88 on driven shaft 14. Piston 45 is secured against rotation relative to drum 33 by means of a plurality of pins 89 which pass through the piston, discs 85 and casting 86.

The positive brakes

Brakes 19, 20 and 21 are of the same general type in that each is comprised of a rotatable ratchet wheel and a non-rotatable radially slidable pawl. The general construction of these brakes is illustrated in Fig. 5. As shown in this figure wherein brake 21 is illustrated, it will be seen that ratchet wheel 43 is provided with relatively sharp teeth 90, each of which is provided with a load-holding face 91 and a camming face 92. Similarly, the cooperating pawl 44 is provided with a relatively sharp tooth 93 having a load holding face 94 and an ejecting face 95. In view of the sharpness of the teeth on both the pawl and wheel, it becomes imperative to prevent a partial engagement of the teeth such that the tips of the teeth will be broken. To this end a blocker mechanism 96 is provided. Said blocker mechanism 96 is comprised of a ring which is oscillatable relative to ratchet wheel 43 through a slight angle. The blocker 96 is provided with substantially square-shaped teeth 97, the ends of which coincide with the ends of teeth 90 on the ratchet wheel. Said ratchet wheel is provided with a pin 98 which rides in a notch 99 in blocker mechanism 96 so as to limit the oscillatory movement of said blocker relative to the ratchet wheel. A spring 100 is tensioned between an ear 101 formed in wheel 43 and an ear 102 formed in blocker 96, said spring 100 maintaining blocker 96 in such position relative to ratchet wheel 43 that teeth 97 prevent radial inward movement of the pawl 44 into engagement with the wheel except when such engagement begins a substantial distance behind the tip of the tooth. In this manner, pawl 44 will have sufficient time to move radially inwardly to prevent such a partial engagement as would harm either the pawl or the wheel.

Ratchet wheel 39 is provided with a similar blocker 103 (Fig. 2), the details of which are disclosed in the copending application of John M. Simpson, Serial No. 426,125, filed January 9, 1942, and hence, will not be described in detail herein.

It is contemplated that brake 20 will be engaged while ratchet wheel 41 is stationary and hence, no blocking mechanism is necessary for brake 20.

Auxiliary braking mechanism for the positive brakes

It is a well-known fact that where a hydraulic power transmitting device, such as the one illustrated, is permanently connected to the drive shaft of an internal combustion engine, the hydraulic device will transmit a certain amount of drag torque when the engine is idling. This drag torque is, of course, impressed upon shaft 15 in the transmission shown and is also impressed upon carrier 35 of planetary gear set 13 and to the gears associated therewith, including ring gear 32 and sun gear 34. When ring gear 32 is permanently connected to the driven wheels of the vehicle and is, therefore, under load, said ring gear will act as a reaction element for the planetary gear set while drag torque is impressed upon carrier 35, and as a result, sun gear 34 is rotated just prior to the engagement of either the forward brake 19 or the reverse brake 21. It is also a well-known fact that a positive-acting control device, such as a ratchet and pawl or other toothed interengageable elements, cannot be engaged readily while torque is impressed upon one or the other of the elements. To avoid this condition in the present transmission, therefore, an auxiliary brake is provided which halts the rotation of the movable elements of brakes 19, 20 and 21 just prior to the engagement of either brake 19 or 21. The auxiliary brake is a friction brake and hence, may be engaged under torque. This brake is shown generally at 104 (Fig. 2) and is comprised of a pressure member 105 operated by an annular piston 106 located in a cylinder 107 in casing 77. Cooperating with pressure member 105 is a friction facing 108 secured to ratchet wheel 39. The pressure is transmitted through ratchet wheel 39 to a friction facing 109 on ratchet wheel 41 and then through a friction facing 110 on the opposite side of ratchet wheel 41 to a fixed abutment member 111, said abutment member 111 being secured to casing 77 by means of one or more bolts 112. A pin 113 passing through abutment member 111 and through piston 106 prevents the latter from rotating relative to casing 77.

When piston 106 is urged to the right (Fig. 2), pressure member 105 engages friction facing 108 and arrests the rotation of ratchet wheel 39. It likewise arrests the rotation of ratchet wheel 41 by reason of the fact that the latter is pressed against abutment member 111. With sun gear 34 held against rotation in this manner and ring gear 32 held against rotation because of the load impressed thereon, carrier 35 will be compelled to stop rotating and accordingly, ratchet wheel 43, which is secured to carrier 35, will likewise be stationary.

Thus, the application of brake 104 arrests the rotation of all of the rotatable elements of the positive brakes 19, 20 and 21.

The stopping of the rotatable elements of the positive brakes does not provide a complete solution to the problem, however, inasmuch as the ratchet wheels may come to rest with the blockers interposed in the path of movement of the pawls. It becomes necessary, therefore, to release auxiliary brake 104 just prior to the engagement of a ratchet wheel with a pawl so that the drag torque may be utilized to rotate the teeth sufficiently to move the blockers out of the way. The manner in which this is done will now be described.

Combination valve and pawl

It will be observed from Figs. 1 and 2 that each pawl is provided with a relatively long stem, which stem functions as a valve. Specifically, pawl 40 is provided with a stem 114 which is cut away at 115 to provide a passageway for fluid under pressure. Said passageway 115 communicates with a conduit 116 in casing 77 which communicates directly with cylinder 107. Similarly, pawl 44 is provided with a stem 117 in which are two passageways 118 and 119. A passageway 120 is provided for interconnecting passageways 118 and 115, and also for connecting passageway 115 with passageway 119 and then to a return conduit 121 which connects with sump 64. Fluid under pressure is admitted to passageway 118 through a conduit 122 from pump 53 by way of valve 63.

As shown in Figs. 1 and 2, pawls 40 and 44 are in a neutral position and when so positioned, fluid under pressure will be admitted through passageways 118, 120, 115 and 116 into cylinder 107 to stop the rotation of the ratchet wheels 39, 41 and 43. It is contemplated that when either pawl 40 or pawl 44 is moved into engagement with its respective ratchet wheel the other pawl will be retracted to a position farther removed from its ratchet wheel. To this end each stem 114 and 117 is made with a lateral slot 123 and 124 respectively, in each of which is mounted a roller 125 and 126 respectively, secured to a pivoted lever 129 which may be rocked by a shaft 130 mounted in casing 77. The various passageways are so arranged that when the pawls are in a neutral position, piston 106 will be biased to engaged position, but when either pawl is moved towards its engaged position, the fluid pressure will automatically be dumped by connecting the cylinder to dump conduit 121. During such time as the cylinder is connected to the dump conduit, the pressure conduit 122 is blocked off by the body of pawl 44. This results in a release of brake 106 just prior to the engagement of a ratchet wheel with a pawl, and since the drag torque of the torque converter 12 is constantly impressed upon the ratchet wheels, the latter will begin to rotate and the blocker, if it was originally located in the path of movement of a pawl, will automatically be rotated out of the way. It will be observed that the shift from forward to reverse requires that the pawls 40 and 44 be positioned in neutral at some intermediate stage of the movement from forward to reverse position, and accordingly, brake 106 will always be applied and then released in shifting between forward to reverse, as, for example, in parking a car. This will automatically arrest the rotation of each ratchet wheel to remove drag torque and then permit the wheels to rotate under the influence of drag torque to avoid a butt-ended condition between a pawl and its ratchet wheel.

*Manual control for pawl*

As shown in detail in Fig. 5, rock shaft 130 is secured at its left-hand end (Fig. 5) to an upright lever 131 which is provided with a parallel-sided slot 132 in the free end thereof. Riding in slot 132 is pin 133 which is secured to a plunger 134 riding in a deep socket 135 formed in a lever 136. Said lever 136 is provided with an elongated parallel-sided slot 137 in which pin 133 likewise is adapted to ride. Lever 136 is pinned to a rock shaft 138 to the free end of which (lefthand end in Fig. 5) is secured an external control lever 139. A spring 140 normally biases plunger 134 to its limiting position in a downward direction as determined by pin 133 striking the lower end of slot 137. It is contemplated that by oscillating lever 139 and its associated rock shaft 138, the oscillatory movement will be transmitted through lever 136, plunger 134, pin 133 and lever 131 to rock shaft 130. Since slots 137 and 132 are adapted to be crossed in any one of a number of different positions, the movement of the latter does not necessarily mean that the movement of the former will follow. The purpose of this arrangement is to permit lever 139 to be moved to the end of its travel in spite of the fact that a pawl may be blocked and its associated levers and pins, up to and including lever 131, may not be able to follow the movement of lever 139. Under such blocked conditions, however, pin 133 is forced upward in its slot to compress spring 140 and thereby store up energy which is later released to move the pawl into complete engagement with its ratchet wheel when the pawl is free.

To avoid jarring a pawl out of engagement after it has once been engaged, plunger 134 is provided with a notch 141 in which is adapted to be received a latch 142 which is constantly biased by a spring 143 toward plunger 134. While in neutral, and through a short arc on either side of neutral position, latch 142 is held in a withdrawn position by a cone 144 secured to the end of the latch 142 and adapted to cooperate with a cam 145 secured to casing 77. A detent 146 cooperates with suitable notches, such as 147 and others (not shown), to indicate to the operator when positions corresponding to forward, neutral and reverse have been reached.

The pawl-operating mechanism from lever 139 to the pawls 40 and 44 is described in greater detail in a copending application of Carnagua, et al., Serial No. 426,128, filed January 9, 1942.

*Push start control*

As described above in connection with the general operation of a transmission, no hydraulic pressure is available when drive shaft 10 is not rotating and accordingly, it is not possible by the ordinary means provided in the transmission to secure a driving connection from driven shaft 14 to drive shaft 10 such as would enable the operator to start the engine by pushing the vehicle. Since no pressure is available, there is no force created within housing 22 tending to move piston 28 to the left (Figs. 1 and 2) against the action of springs 79 to release clutch 17 and accordingly, said clutch is engaged and remains engaged under the action of springs 79 whenever drive shaft 10 ceases to rotate. This provides a direct connection between intermediate shaft 15 and drive shaft 10, and it remains, therefore, merely to provide a connection between said shaft 15 and driven shaft 14 in order to effect the starting of the engine by pushing the vehicle. This connection is shown in Fig. 5 and comprises the pawl 42 previously mentioned and suitable external controls for the pawl.

Pawl 42 is radially slidable in an opening 200 in casing 77 and is provided with a stem 201 of lesser diameter than the diameter of the pawl. A pawl operator 148 is likewise received in opening 200 and is slidable radially therein. Said operator 148 has an opening 149 therein for receiving the end of stem 201. A pin 150 passing through stem 201 and riding in a slot 151 provides a lost-motion connection between operator 148 and stem 201 such that operator 148 may move radially inwardly without requiring that stem 201 do likewise. A spring 152 is normally compressed between operator 148 and pawl 42 so that it tends to separate the two and take up the lost-motion connection. Should operator 148 be moved radially inwardly while pawl 42 is butt-ended with respect to its corresponding ratchet wheel 41, the radial inward movement of operator 148 will merely compress spring 152 and store up energy which is later utilized when the butt-ended condition ceases to exist, to urge pawl 42 into full engagement with its ratchet wheel.

Operator 148 is formed with a transverse slot 153 in which is mounted a roller 154 rotatably secured to the end of a crank 155 of a small oscillatable crank shaft 156. Said crank shaft 156 is mounted in a lug 157 in casing 77. A crank 158 mounted on the free end of crank shaft 156 is connected to a rod 159 which in turn is connected to a second crank 160 mounted in a boss 161 in casing 77. Said crank 160 extends upward from casing 77 in the form of a lever 162 the end of which may be connected by means of a Bowden wire 163 or the like to a suitable control (not shown) at the dash of the vehicle. Thus, by pushing or pulling Bowden wire 163, lever 162 will be oscillated through a small arc which in turn will move rod 159 vertically, thereby rotating crank shaft 156 and reciprocating operator 148 in opening 200. The reciprocation of operator 148 is transmitted to pawl 42 through pin-and-slot connection 150, 151 and spring 152 to engage or disengage pawl 42 with its ratchet wheel 41. When pawl 42 is engaged with its ratchet wheel, a positive reaction is provided for sun gear 34, and the rotation of driven shaft 14 which results from pushing the vehicle is then transmitted through the planetary gear train to shaft 15 which, as we have already seen, is directly connected to drive shaft 10 through clutch 17. Just as soon as the engine begins to rotate under its own power, ratchet wheel 41 will rotate in a manner to eject pawl 42 therefrom, assuming, of course, that the transmission is in neutral so as to permit the engine to rotate freely. The ratcheting sound produced by the ejection of pawl 42 from ratchet wheel 41 informs the operator that the reaction provided by pawl 42 is no longer necessary and he may then operate Bowden wire 163 in a manner to release pawl 42 from its ratchet wheel 41.

*The hydraulic circuits*

It will be remembered that when drive shaft 10 is rotating, pump drive gear 55 is likewise rotating and accordingly, pump 53 will be driven to deliver fluid under pressure to conduit 59. Said conduit 59 is a branch of a principal conduit 164 which has two other branches 165 and 166. Valve 63 is interposed in conduit 164 and is provided with radial portings 167, 168 and 169 which are so arranged that when the valve is in the position shown in Fig. 1, conduit 164 communicates with conduit 122 leading to the valve attached to the pawl, and when valve 63 is rotated in a clockwise direction to a position 45 degrees removed from that shown, conduit 122 will be blocked off and conduit 164 will communicate directly with a dump conduit 170 leading to sump 64. It is contemplated that valve 63 will be moved in a counter clockwise direction to an intermediate position 45° from that shown when the transmission is conditioned for neutral so that passageway 122 is connected to dump conduit 170 to insure the release of all of the brakes and that porting 168 will not be aligned with dump conduit 170 so that pressure will be available in the remainder of the system. When the transmission is in neutral, pump 53 supplies fluid under pressure to conduit 59, 164, 165 and 166. The pressure in these conduits will be regulated by pressure regulating valve 60 to that required for the operation of the various clutches and brakes. This pressure, of course, may be varied to suit the particular requirements of the transmission and may be as high as sixty pounds per square inch if necessary. It has been found, however, that for the operation of the torque converter, a lesser pressure may be sufficient and accordingly, a second pressure regulating valve 62 is used which operates on the fluid as it leaves the first pressure regulating valve 60 and regulates the pressure in conduit 61 and the torque converter chamber in communication therewith to approximately thirty pounds per square inch. All fluid in excess of that required to maintain the desired pressure in line 61 is then returned to sump 64 by means of a return conduit 171.

It will be remembered that springs 79 normally bias clutch 17 to engaged position so that when the engine is dead, a driving connection will be established between shaft 15 and drive shaft 10. When housing 22 is filled with fluid under pressure, however, the spring pressure is opposed by the hydraulic pressure, and it is contemplated that the latter shall exceed the former so that the clutch will be released just as soon as sufficient pressure is built up within the housing. When in neutral, therefore, and with the engine running, clutch 17 is disengaged and will not be reengaged until fluid at a higher pressure is admitted on the spring side of piston 28. When the transmission is conditioned for forward drive, a control lever at the steering column (hereinafter to be described) is provided having two directions of movement, the first of which rotates valve 63 in a manner to admit fluid under pressure to line 122 and the second of which operates external lever 139 of the pawl control system to move one or the other of the pawls into engagement with its ratchet wheel. The hydraulically operated brake will then be controlled in accordance with the movement of the pawls and their associated valves as described hereinabove.

Clutch control valve 48 is a two-part valve, the first part comprising lands 172 and 173 controlling lockup clutch 17 and the second part comprising lands 174 and 175 controlling ratio clutch 18. A common land 176 separates the two parts. The porting of the valve block 177 is so arranged that in one position of the valve, fluid will be admitted to clutch 17 but not to clutch 18, and in a second position fluid will be admitted to both clutches. When fluid under pressure is not being admitted to either clutch, the porting is such that the fluid will be drained into dump passageway 171.

Valve 48 is normally urged to a dumping position by a tension spring 178 and is urged in the opposite direction by a two-stage solenoid 56, said solenoid being comprised of two sets of windings independently controlled, each set being effective to move the valve through a given distance. The solenoid is electrically controlled from governor 58 and control circuit 57 as will now be detailed.

*Electrical circuits*

The electical circuit as shown in Fig. 7 and in the embodiment selected for illustrative purposes is comprised of a battery 179, or other suitable source of electromotive force and two main branches 180 and 181. In branch 180 is a relay 182 having a pair of contacts 183 which are adapted to connect the battery to a starter 184. Relay 182 is controlled by a starter switch 185 of the usual variety and a special control switch 186 in series with the starter switch. Switch 186 is controlled by the hand lever (hereinafter to be described) in such a manner that the starter may not be operated unless the lever is in a neutral position.

In branch 181 is a main control switch 187 which is likewise operated by the hand control lever so as to render the entire second branch inoperative when the transmission is conditioned for reverse, since in reverse the drive and driven members of the clutches 17 and 18 are intended to rotate in opposite directions relative to one another, and it is imperative, therefore, that these clutches shall not be engaged when the transmission is in reverse. In series with switch 187 is a downshift or kickdown switch 188 having two pairs of contacts 189 and 190 located in parallel circuits leading from switch 187. The switch is preferably operated by the accelerator pedal 241 although it may also be operated independently. In series with each pair of contacts 189 and 190 are speed controlled switches 191 and 192 respectively, both of which may be operated by governor 58 to close at approximately twelve miles per hour. Another switch 193 having pairs of contacts 194 and 195 in series, respectively, with governor switches 191 and 192 is used to delay the operation of the solenoid in accordance with the torque requirements of the operator. To this end switch 193 is operated by a pressure differential device 196 having a diaphragm 197 connected to to the switch 193, a spring 198 normally tending to disengage contacts 194 and 195, and a vacuum line 199 connected to the engine manifold (not shown).

Contacts 194 are connected to a ratio relay 202 and contacts 195 are connected to a lockup relay 203. Ratio relay 202 is provided with a pair of contacts 204 which connect the battery to operating coil 205 and holding coil 206 of the ratio portion of solenoid 56. Lockup relay 203 is provided with a pair of contacts 207 which connect the battery to operating coil 208 and holding coil 209 of the lockup portion of solenoid 56. It is contemplated that each portion of the solenoid will be provided with a separate armature which is connected to valve 48 and that each armature is provided with a pair of contacts 210 and 211 respectively, which are normally closed so as to complete the circuit through operating coils 205 and 208 respectively, but which break the circuit through said coils upon movement of the respective armatures, thereby reducing the drain on the battery. Each armature, meanwhile, is maintained in its operative position by its holding coil 206 or 209. In this respect, the armatures, operating coils, holding coils and circuit breaking switches are similar to those used on commercial overdrives.

A speed responsive switch 212, such as a wind switch or the like, is used to connect the battery directly to lockup relay 203 above a predetermined speed of the vehicle. This renders lockup relay 203 independent of vacuum control switch 193 at the governed speed of switch 212 so that regardless of torque demand the torque converter will be locked up.

The operation of the circuit is as follows:

Assuming that the control lever is in neutral and switch 186, therefore, closed, the engine is started by closing starter switch 185 and the operator then conditions the transmission for forward operation and in so doing closes switch 187 and opens switch 186. Downshift switch 188 is normally held in a position to complete the circuit across contacts 189 and 190 and governor switches 191 and 192 are open. The circuit to relays 202 and 203 are, therefore, broken and valve 48 is in a dumping position. When the operator depresses the accelerator pedal 241 to start the vehicle moving, there is insufficient vacuum to overcome spring 198 of pressure differential device 196 and the circuit across contacts 194 and 195 controlled by switch 193 is broken. This condition obtains as long as accelerator pedal 241 remains in a depressed position. At the governed speed of switches 191 and 192 which, as stated above, may be set at approximately twelve miles per hour, both of these switches will be operated, thereby conditioning the circuits to relays 202 and 203 for operation, subject, however, to the release of accelerator pedal 241. Just as soon as the accelerator pedal 241 is released, the vacuum control switch 193 will complete both circuits and relays 202 and 203 will operate to connect the battery to both the lockup and ratio solenoids. Both clutches controlled by these solenoids will then engage and the transmission will be in direct drive. To avoid a constant engagement and disenegagement of the clutches during operation above a governed speed of switches 191 and 192, such as would result from the sucessive making and breaking of the circuit through switch 193 by reason of the accelerator pedal being repeatedly raised and depressed, resistances 213 and 214 are connected across contacts 194 and 195 respectively, said resistances being sufficiently high to prevent the operation of relays 202 and 203 but being sufficiently low such that when once operated, these relays will remain operated despite a subsequent disconnection of contacts 194 and 195.

If, after the governed speed of switches 191 and 192 has been reached, the accelerator pedal is maintained in a depressed position beyond the governed speed of switch 212, said switch will operate, thereby operating lockup relay 203 and solenoid 208 while the ratio solenoid 205 is still disengaged. The latter will then be operated upon a subsequent release of accelerator pedal 241.

If increased acceleration is desired above a governed speed of switch 212, downshifting switch 188 may be operated to break the circuit across contacts 189 and 190. This will release the ratio clutch but will not release the lockup clutch since speed-responsive switch 212 is connected across downshift contacts 190. In this manner a downshift into the torque converter at speeds at which the converter can no longer multiply torque is avoided. If downshifting switch 188 is operated below the governed speed of switch 212, but above the governed speed of switches 191 and 192, both the lockup and ratio clutches will be released and torque multiplication will be provided through the converter as well as through the gearing.

*Manual controls*

The manual controls are shown in Fig. 6 and are operated by means of a single lever 215, preferably located beneath the steering wheel, which is adapted to be moved from a depressed central position corresponding to a neutral position to a raised and then counterclockwise rotated position corresponding to reverse and a raised clockwise rotated position corresponding to forward position.

Said lever 215 is pivoted at 216 to an axially fixed rotatable rod 217 and is also pivotally connected to a bracket 218 which surrounds rod 217 and is rotatable relative thereto. Said bracket 218 is axially movable relative to rod 217 in response to vertical movement of lever 215. The pivotal support for bracket 218 is comprised of a relatively long hollow tube 219 which may be supported from a fixed bracket 220. Said bracket 220 is formed with a pair of spaced lugs 221 and 222 between which is pivotally mounted a lever 223. Lever 223 is provided with a depending extension 224 in which is located a notch 225. Opposite extension 224 is a fixed bracket 226 having an opposed notch 227 therein. Tube 219 is provided with a laterally extending lug 228 which is adapted to ride in one or the other of the notches 225 and 227. Tube 219 terminates in a ball 229 to which is pivotally mounted a lever 230 passing through and fulcrumed in an aperture 231 in bracket 226. Aligned with the pivotal connection between lever 230 and ball 229 is switch 186 which, as we have seen, controls the starter circuit. Two bell cranks 232 and 233 are operated by lever 230, bell crank 233 being connected by a rod 234 to valve 63 and bell crank 232 being connected by rod 235 to the valve 236 of the carburetor of the engine which controls the idling speed thereof.

Lever 223 is connected by a rod 237 to external control 139 for pawls 40 and 44. Lever 223 also operates switch 187 which is used to render operative or inoperative the electrical control circuit for the selector valve 48.

The manual controls are operated as follows:

When hand lever 215 is in its downward and central position, tube 219 is lowered, thereby operating starter control switch 186 to complete the circuit therethrough, and rotating both bell cranks 232 and 233 in a clockwise direction as viewed in Fig. 6, bell crank 232 being so moved by means of a spring 238. This causes valve 63 to be conditioned to prevent the operation of brake 104, and to dump all fluid pressure in the system including that in the hydraulic torque converter 12. By dumping all fluid pressure in this manner a considerable load is removed from the starter as it turns the engine over.

When lever 215 is moved upward to the position wherein it can be moved either to the reverse or forward position, bell cranks 232 and 233 are rotated in a counter-clockwise direction, crank 233 being so moved by a spring 239, thereby rotating valve 63 to the position wherein pressure may be built up to fill the torque converter housing 22. The pressure then releases clutch 17 and conditions the torque converter for operation.

During the greater portion of the time that lever 215 is moving vertically, lug 228 is riding in notch 227 in fixed bracket 226, and lever 215, therefore, cannot be rotated in either direction. At the top of its travel, however, lug 228 leaves notch 227 and enters notch 224 of pivoted lever 223. Hand control lever 215 may, therefore, be moved either to reverse or to forward position. When moved to reverse position, switch 187 is disconnected so that the electrical circuit is no longer operative to effect automatic shifts in the transmission. Simultaneously, lever 139 is pulled to the left (Fig. 6) to rock shaft 130 and engages reverse pawl 44. If the lever 215 is moved to the forward position, switch 187 is made to render the electrical controls operative and lever 139 is pushed to the right (Fig. 6) to rock shaft 130 to disengage reverse pawl 44 and to engage forward pawl 40. During the lateral movement of lever 215, valve 63 remains in its open position.

Carburetor control

One of the principal difficulties encountered in the operation of a transmission employing a hydraulic torque converter is that of shifting into forward or reverse immediately after starting the engine on a cold day. Modern engines are almost universally equipped with an automatic valve on the carburetor which automatically enriches the mixture to provide a fast idling speed in order that the engine may continue to operate and warm up in the shortest possible time. Since the torque transmitted by the hydrodynamic torque converter is a function of the speed of rotation of the pump element thereof, a fast idling engine increases the difficulty with which positively interengageable forward and reverse mechanisms such as pawls 40 and 44 may be operated. To remedy this situation a control for valve 236 is employed. Bell crank 232 and rod 235 are so arranged with respect to valve 236 that when lever 215 is in its downward position corresponding to the position at which the starter may be operated, valve 236 is in the usual fast idling position so as to assist in warming up the engine. When lever 215 is raised, however, prior to a shift into either forward or reverse such as would entail the engagement of positively interengageable elements, bell crank 232 is rotated in a manner to close valve 236 to the normal idling position. In this manner, the engine may be warmed up with a fast idling carburetor, but when the operator is ready to engage either the forward or reverse driving mechanism, the idling speed is automatically dropped to that most favorable for the operation desired. The fast idle, therefore, is controlled by the operator and not by a thermostat as is usually the case and can be brought down to a normal value just prior to shifting into forward or reverse.

Summary of operations

The operation of the transmission has been described generally in connection with the detailed description of the transmission, and the operation of each of the component features of the transmission has been described along with the description of each feature. No detailed description of the operation of the transmission, therefore, is believed to be necessary herein. The operation, however, may be summarized as follows:

The principal control is the hand lever 215. While lever 215 is in its neutral downward position, the engine may be started by closing starter switch 185, switch 186 being closed at this position of lever 215. Valve 236 is in its fast idle position and when the engine commences to rotate under its own power, drive shaft 10 and housing 22 will likewise be rotated. Valve 63, however, is in its pressure dumping position, thereby preventing the building up of pressure within housing 22. Clutch 17 will be engaged but since the remaining clutches and brakes are disengaged, no power will be transmitted to driven shaft 14. If the operator wishes to back the car, he raises lever 215 to its top position, thereby engaging lug 228 with notch 225 in lever 223, and then rotates lever 215 to the reverse position, thereby operating switch 187 to disconnect the electrical controls and also moving reverse pawl 44 into engagement with its ratchet wheel 43. During the upward movement of lever 215, valve 236 is moved to a normal idling position and valve 63 is rotated through the position wherein fluid under pressure is admitted to housing 22, and then to the position wherein fluid under pressure is admitted to the hydraulically operated brake 104. This brake, accordingly, is operated to arrest the rotation of reverse ratchet wheel 43 to enable pawl 44 to engage the wheel substantially without clash. Any butt-ending condition which may have existed at the time because of the blocker associated with the wheel was removed by the subsequent release of brake 104 which permitted the wheel to rotate the blocker out of the way.

When the operator wishes to move forward, lever 215 is moved to the forward position thereby closing switch 187, disengaging reverse pawl 44 and engaging forward pawl 40. Neither valve 63 nor valve 236 was disturbed during this maneuver. While lever 215 is in the raised position, however, it is impossible to operate the starter since switch 186 is open by the upward movement of tube 219. If, after the transmission is set for forward drive, the accelerator pedal is depressed to start the car moving, pressure differential device 196 breaks the circuit to solenoid 56 and thereby prevents the operation of clutches 17 and 18. At a speed of approximately twelve miles per hour, speed controlled switches 191 and 192 will operate to complete the circuit therethrough and render possible the engagement of clutches 17 and 18. The engagement will occur when accelerator pedal 241 is released so as to create vacuum in pressure differential device 196 and move it in a direction to operate switches 194 and 195. When these switches are operated, solenoid 56 will move valve 48 to a position to admit fluid under pressure into both conduits 49 and 47 to operate both clutches. A downshift is made possible by operating downshifting switch 188. It is contemplated that this switch shall be operated by the accelerator pedal during a movement of the latter past its wide open position. The breaking of the circuit through contacts 189 and 190 causes solenoid 56 to be deenergized, which in turn causes spring 178 to pull valve 48 to its pressure dumping position. Clutches 17 and 18, therefore, will be disengaged. Above the governed speed of switch 212, however, a downshift into the torque converter is impossible and likewise, above the governed speed of the switch 212, a delay in the operation of clutch 17 by virtue of the open condition of switch 193 is also impossible.

It is apparent that the transmission described will serve to drive a vehicle under all of the normal conditions which may exist, and that the drive will be extremely efficient despite the fact that a hydraulic torque converter constitutes an important part of the transmission. The various defects of the converter have been remedied by suitable controls to render unnecessary any special instructions to an operator by virtue of the presence of the converter. All rotating parts have been made extremely light to reduce rotational inertia to compensate for the increase in rotational inertia which results from the mass of fluid and associated parts present in the converter. A combination of hydraulic and electrical controls is used which provides for the automatic operation of the transmission with a minimum of complexity. Thus, the hydraulic system per se is quite simple, and the electrical system, likewise, is quite simple.

It is understood that the foregoing description is merely illustrative of a preferred embodiment of the invention and that the scope of the invention, therefore, is not to be limited thereto but is to be determined by the appended claims.

We claim:

1. A transmission comprising driving and driven shafts, a hydrodynamic device driven from the drive shaft and including a stator element, differential gearing connected to drive the driven shaft and including a gear which is adapted to function as a reaction element for the conversion of torque, means transmitting the drive from the hydrodynamic device to the gearing, means for by-passing the hydrodynamic device and gearing to provide a direct drive between the shafts, a common supporting means for the reaction gear and stator, automatically releasable means for holding the supporting means against reverse rotation, and an automatically releasable connection between the stator and the common support, whereby said stator may rotate in one direction relative to said support.

2. A transmission comprising driving and driven shafts, a hydrodynamic device driven from the drive shaft, differential gearing connected to drive the driven shaft, said gearing comprising a sun gear adapted to act as a fulcrum for torque multiplication, planet pinions, a carrier for the planet pinions and a ring gear directly connected to the driven shaft, means for transmitting the drive from the hydrodynamic device to the gearing, means for by-passing the hydrodynamic device, means for directly connecting the carrier and ring gear to provide a direct drive through the gearing, and an automatically releasable brake for the sun gear, said brake being effective automatically to release the gearing when the carrier is connected to the ring gear.

3. A transmission comprising driving and driven shafts, a hydrodynamic device driven from the drive shaft, said device comprising a pump element, a turbine element and a stator element; differential gearing connected to drive the driven shaft and comprising a sun gear adapted to act as a fulcrum for torque multiplication, planet pinions, a carrier for the planet pinions, and a ring gear directly connected to the driven shaft; means directly connecting the turbine element and carrier, common supporting means for the sun gear and stator, a releasable connection between the stator and supporting means, a manually controlled brake for the sun gear, a manually controlled brake for the carrier, the sun gear brake when applied providing a reaction point for the stator and sun gear for forward drive and the carrier brake when applied serving to interchange the functions of the turbine and stator elements to provide a reverse drive through the gearing, means for directly connecting the ring gear and carrier for direct drive and means for automatically breaking the connection between the sun gear and the sun gear brake when said direct drive is effective.

4. A transmission comprising driving and driven shafts, a hydrodynamic device driven from the drive shaft, differential gearing connected to drive the driven shaft, and means for transmitting the drive from the hydrodynamic device to the gearing, said gearing including a cast metal ring gear, a light-weight sheet metal drum connecting the ring gear to the driven shaft, and means within the drum for directly connecting the driven shaft to the hydrodynamic device, thereby to by-pass the gearing.

5. A transmission comprising driving and driven shafts, a hydrodynamic device driven from the drive shaft, differential gearing connected to drive the driven shaft, and means for transmitting the drive from the hydrodynamic device to the gearing, said gearing including a ring gear, a light-weight sheet metal drum connecting the ring gear to the driven shaft, said drum having an annular recess formed therein and constituting an annular cylinder, means within the drum for directly connecting the driven shaft to the hydrodynamic device, and piston means in the cylinder for operating the direct connecting means thereby to by-pass the gearing.

6. A transmission comprising driving and driven shafts, a hydrodynamic device driven from the drive shaft, differential gearing connected to drive the driven shaft, means transmitting the drive from the hydrodynamic device to the gearing, toothed devices associated with the gearing and manually operable to establish forward, reverse and neutral conditions in the transmission, power-operated means for by-passing the hydrodynamic device and gearing to provide a direct drive between the shafts, and an auxiliary power-operated device cooperable with the toothed devices to absorb drag torque produced by the hydrodynamic device whereby to facilitate manual operation of the toothed devices.

7. A transmission comprising driving and driven shafts, a hydrodynamic device driven from the drive shaft, said device comprising a housing, fluid under pressure in the housing, a pump element driven from the housing, a turbine element, and means for providing a fulcrum for torque multiplication; a clutch for providing a direct connection between the turbine element and drive shaft, said clutch comprising a driven element rotatable with the turbine element and a pressure differential device, said last-mentioned device being exposed to the fluid under pressure in the housing at all times, resilient means constantly biasing the clutch to engaged position, said resilient means supplying insufficient force to maintain the clutch engaged when the housing is substantially filled with fluid under pressure, and means for supplying fluid under greater pressure to the pressure differential device for overcoming the pressure of the fluid within the housing and thereby engaging the clutch.

8. A transmission comprising driving and driven shafts, a hydrodynamic device driven from the drive shaft, said hydrodynamic device including a housing substantially filled with fluid under pressure, differential gearing connected to drive the driven shaft, means for transmitting the drive from the hydrodynamic device to the gearing, means for locking up the hydrodynamic device for one-to-one drive therethrough, means for providing a direct drive through the gearing, power means for operating the lockup means and the direct drive means, means for normally breaking the drive between the driven and drive shafts when the driven shaft becomes the driver, additional means constantly tending to engage the lockup means, and manually operable means cooperating with the gearing to provide a substitute drive between the driven and drive shafts through the gearing and lockup means, said substitute drive being independent of the power means for operating the lockup and direct drive means.

9. A transmission comprising driving and driven shafts, a hydrodynamic device driven from the drive shaft, differential gearing connected to drive the driven shaft, means transmitting the drive from the hydrodynamic device to the gearing manually operated positive devices for producing selectively a reverse drive or a reduced drive through the transmission, power-operated means for producing a one-to-one drive through the hydrodynamic device, power-operated means for producing a direct drive through the gearing, and additional means for producing a reduced drive through the gearing only when the driven shaft is the driver, said lockup means for the hydrodynamic device being normally operative to lock up the device and to provide a direct connection between the drive shaft and the gearing.

10. A transmission comprising driving and driven shafts, a hydrodynamic device driven from the drive shaft, differential gearing connected to drive the driven shaft, means transmitting the drive from the hydrodynamic device to the gearing, means for establishing a one-to-one drive through the hydrodynamic device, means for establishing a direct drive through the gearing, said one-to-one drive means and direct drive means being power-operated, and means responsive to the speed of rotation of one of said shafts for controlling the operation of the power-operated means.

11. A transmission device as described in claim 10, an engine connected to the drive shaft, said engine being adapted to create a vacuum in accordance with the condition of operation thereof, and means controlled by the vacuum so produced for delaying the operation of the power-operated means.

12. A transmission comprising driving and driven shafts, a hydraulic torque converter driven from the drive shaft, planetary gearing connected to drive the driven shaft, means transmitting the drive from the hydraulic torque converter to the gearing, means for locking up the torque converter, means for locking up the gearing to provide a direct drive therethrough, means responsive to the speed of rotation of one of the shafts for controlling the lockup means for the torque converter and gearing, means for delaying the operation of said lockup means after it is conditioned for operation by the speed responsive means, and additional speed responsive means operable as a function of the speed of rotation of one of said shafts to lock up the torque converter above a predetermined speed of rotation of said speed responsive means regardless of the condition of operation of the delaying means.

13. A transmission comprising driving and driven shafts, a hydraulic torque converter driven from the drive shaft, differential gearing connected to drive the driven shaft, means transmitting the drive from the torque converter to the gearing, means for locking up the torque converter, means for producing a direct drive through the gearing, means responsive to the speed of rotation of one of the shafts for simultaneously operating the lockup means for the torque converter and the gearing, and means under the control of the operator for simultaneously rendering inoperative the means for locking up the torque converter and gearing after the lockup means has been operated.

14. A transmission device as described in claim 13, and additional means for rendering the manually controlled means ineffective to unlock the torque converter.

15. A transmission comprising driving and driven shafts, a torque converting device driven from the drive shaft, a second torque converting device connected to drive the driven shaft, means for transmitting the drive from the first torque converting device to the second, means for providing a one-to-one drive through the first device, means for providing a one-to-one drive through the second device, fluid means for operating each of said devices, a pair of valves for controlling the fluid means, electromagnetic means for controlling the valves, and switch means responsive to the speed of rotation of one of the shafts for simultaneously operating both valves to provide a direct drive between the driving and driven shafts.

16. A transmission device as described in claim 15, an engine connected to the drive shaft, said engine being adapted to operate under varying conditions in response to operator control thereof, and switch means responsive to the various conditions of operation of the engine for delaying the operation of the valves until the engine is conditioned for substantially idling operation.

17. A transmission device as described in claim 15, means for delaying the operation of the valves after they have been conditioned for operation by the speed responsive switch means, and additional speed responsive means, operable as a function of the rotation of one of the shafts, for rendering the delay means ineffective as to the valve controlling one of the one-to-one drive means for the torque converter.

18. A transmission device as described in claim 15, and manually controlled switch means for rendering the speed responsive switch means ineffectual to cause the operation of either valve.

19. A transmission device as described in claim 15, means for simultaneously rendering the speed responsive control means ineffectual to operate both valves, and means effective as a function of the speed of rotation of one of the shafts for limiting the effectiveness of the last-mentioned means to but one of the valves.

20. A transmission comprising driving and driven shafts, a hydraulic torque converter driven from the drive shaft, differential gearing connected to drive the driven shaft, means transmitting the drive from the converter to the gearing, means for locking up the converter, means for providing a direct drive through the gearing, fluid means for operating the lockup and direct drive means, a pair of valves controlling the fluid means, electromagnetic means controlling the valves, a switch responsive to the speed of one of the shafts for controlling the valves whereby to condition them for operation above a predetermined speed of rotation of said shaft, manually controlled means for overcontrolling the speed responsive means to disconnect the lockup in the converter and the direct drive in the gearing, and speed responsive means effective above a predetermined speed of rotation of one of said shafts for limiting the effectiveness of the last-mentioned means to the valve controlling the direct drive through the gearing whereby the converter remains locked up above said predetermined speed of rotation regardless of the operation of said manual overcontrol means.

21. A transmission comprising in combination, driving and driven shafts, a hydrodynamic device, said device including an impeller element, a rotor element and a stator element, said impeller element being connected with said driving shaft to be driven thereby, said stator element when restrained in rotation being adapted to cause the rotor element to be driven at multiplied torque, differential gearing connected to drive said driven shaft, means transmitting the drive from said rotor element to said gearing, means for by-passing the hydrodynamic device and gearing to provide a direct drive between said shafts, and a common releasable reaction means for the gearing and said stator element functioning to restrain the stator element from rotation, said reaction means being automatically released when said hydrodynamic device and said gearing are by-passed.

22. A transmission comprising driving and driven shafts, a hydrodynamic device driven from the drive shaft and including a stator element for multiplying torque, differential gearing connected to drive the driven shaft, means transmitting the drive from the hydrodynamic device to the gearing, means for by-passing the hydrodynamic device and gearing to provide a direct drive between the shafts, a common releasable reaction means for the gearing and the stator element of the hydrodynamic device which is automatically released when the gearing is by-passed, and manual control means for the releasable reaction means whereby said reaction means may be released at the option of the operator.

23. A transmission comprising in combination, driving and driven shafts, a hydrodynamic device, said device including an impeller element, a rotor element and a stator element, said impeller element being connected with said driving shaft to be driven thereby, said stator element when restrained in rotation being adapted to cause the rotor element to be driven at multiplied torque, differential gearing connected to drive the driven shaft, means transmitting the drive from said rotor element to said gearing, means for by-passing the hydrodynamic device and gearing to provide a direct drive between said shafts, and a one-way brake common to the gearing and to said stator element for providing a releasable reaction means therefor and restraining the rotation of the stator element, said one-way brake being automatically released when said hydrodynamic device and said gearing are by-passed.

24. In a control mechanism for a power transmitting device, said device including a driving shaft, a driven shaft, a rotatable element and another element engageable therewith, said elements cooperating to complete a power train through said device between said shafts, an operator for effecting the engagement of the elements, means biasing the operator to effect the engagement, means adapted to be acted upon by opposed differential pressures and associated with the operator and normally effective as a function of the operation of the power transmitting device to counteract the biasing means and thereby disengage the elements, and means operative at a predetermined speed of rotation of one of said shafts for causing said second-named means to assist the biasing means to effect an engagement of the elements.

25. In a control mechanism for a power transmitting device, said device including a driving shaft, a driven shaft, a rotatable element and another element engageable therewith, said elements cooperating to complete a power train through said device between said shafts, an operator for effecting the engagement of the elements, a spring constantly biasing the operator to effect the en-

19 gagement, means adapted to be acted upon by opposed differential pressures and associated with the operator and normally effective as a function of the operation of the power transmitting device to counteract the spring and thereby disengage the elements, and means operative at a predetermined speed of rotation of one of said shafts for causing said first-named means to assist the spring to effect an engagement of the elements.

26. In a control mechanism for a power transmitting device, said device including a driving shaft, a driven shaft, a rotatable element and another element engageable therewith, said elements cooperating to complete a power train through said device between said shafts, an operator for effecting the engagement of the elements, means biasing the operator to effect the engagement, a piston associated with the operator and normally effective as a function of the operation of the power transmitting device to counteract the biasing means and thereby disengage the elements, and means operative at a predetermined speed of rotation of one of said shafts for introducing fluid under pressure behind the piston to cause the piston to assist the biasing means to effect an engagement of the elements.

27. In a control mechanism for a power transmitting device, said device including a driving shaft, a driven shaft, a rotatable element and another element engageable therewith, said elements cooperating to complete a power train through said device between said shafts, an operator for effecting the engagement of the elements, a piston associated with the operator and normally effective as a function of the operation of the power transmitting device to maintain the elements disengaged, spring means continuously effective upon the operator to bias the elements to engaged position, and means operative at a predetermined speed of rotation of one of said shafts for causing the piston to assist the spring means to effect an engagement of the elements.

28. A combination as described in claim 27, the operator and piston comprising a single unit which is movable as a whole to control the elements.

29. In combination, a driving shaft, a driven shaft, a hydrodynamic power transmitting device having a driving or impeller element and a driven or rotor element, said driving element being adapted to be driven by said driving shaft and said driven element being adapted to drive said driven shaft, a housing for the device, a clutch within the housing and adapted to connect the driving and driven elements together and thereby to complete a power train between said shafts, fluid in the housing, said fluid being placed under pressure as a function of the rotation of the driving element, an operator for the clutch, means adapted to be acted upon by opposed differential pressures and associated with the operator and sensitive to the fluid pressure in the housing for biasing said means to disengage the clutch, means effective below a predetermined pressure in the housing for effecting the engagement of the clutch, and means operative at a predetermined speed of rotation of said driven shaft for overcoming the fluid pressure in the housing to effect engagement of the clutch.

30. In combination, a driving shaft, a driven shaft, a hydrodynamic power transmitting device having a driving or impeller element and a driven or rotor element, said driving element being adapted to be driven by said driving shaft and said driven element being adapted to drive said driven shaft, a housing for the device, a clutch within the housing and adapted to connect the driving and driven elements together and thereby complete a power train between said shafts, fluid in the housing, a pump driven with said driving element for placing the fluid in the housing under pressure, an operator for the clutch, a piston associated with the operator and having one side exposed to the fluid in the housing whereby to cause the operator to disengage the clutch, means biasing the piston in an opposite direction to effect the engagement of the clutch, said last-named means exerting less pressure on the piston than the fluid under pressure in said housing, and other means adapted to be effective above a predetermined speed of rotation of said driven shaft for overcoming the fluid pressure in said housing to effect engagement of said clutch.

31. In combination, a hydraulic torque converter comprising a pump element, a driven or turbine element, and a stator element, a housing for the converter, a clutch within the housing and adapted to connect the pump and turbine elements together, fluid in the housing, a pump for placing the fluid in the housing under pressure, said pump being driven with the converter pump element, a pressure member for the clutch, a piston associated with the pressure member and on one side thereof being exposed to the fluid pressure in the housing for biasing the pressure member to disengage the clutch, spring means constantly biasing the pressure member to engage the clutch, said spring means being less powerful than the total pressure developed by the fluid in the housing acting upon the piston, and means for applying fluid under pressure upon the opposite side of the piston to overcome the pressure of fluid in the housing on the piston to engage the clutch regardless of the pressure within the housing.

32. A transmission for an automotive vehicle comprising driving and driven shafts, a hydraulic torque converter driven from said drive shaft, planetary gearing connected to drive said driven shaft, means transmitting the drive from said torque converter to said gearing, a clutch for locking up said torque converter, a clutch for locking up said gearing to provide a direct drive therethrough, power means for operating both of said clutches, means responsive to the speed of rotation of one of said shafts for controlling said power means to cause engagement of said clutches as the the speed of said one shaft increases, an accelerator for the vehicle, and means responsive to movement of said accelerator past the open throttle position for overruling said speed responsive means and disengaging both of said clutches whereby the drive is transmitted through said torque converter and said gearing.

33. A transmission for an automotive vehicle comprising driving and driven shafts, a hydraulic torque converter driven from said drive shaft, planetary gearing connected to drive said driven shaft, means transmitting the drive from said torque converter to said gearing, a clutch for locking up said torque converter, a clutch for locking up said gearing to provide a direct drive therethrough, power means for operating both of said clutches, means responsive to the speed of the vehicle for controlling the operation of said power means to cause engagement of both of said clutches as the speed of the vehicle increases, an accelerator for the vehicle, and means responsive to movement of said accelerator past the open throttle position for overruling said speed responsive means below a predetermined vehicle speed and disengaging both of said clutches whereby the drive is transmitted through said torque converter and said gearing, said accelerator responsive means being ineffective to overrule said speed responsive means with respect to one of said clutches above said predetermined vehicle speed so that said last-named clutch remains engaged when said accelerator is moved to its open throttle position.

34. A transmission comprising driving and driven shafts, a hydraulic torque converter driven from said drive shaft, planetary gearing connected to drive said driven shaft, means transmitting the drive from said torque converter to said gearing, a clutch for locking up said torque converter, a clutch for locking up said gearing to provide a direct drive therethrough, power means for operating both of said clutches, and means responsive to the speed of rotation of said driven shaft for controlling the operation of said power means so as to cause engagement of said clutches when said driven shaft reaches a predetermined speed, said speed responsive means disengaging both clutch means on a decrease in speed whereby the drive is transmitted through said gearing and torque converter.

35. In transmission mechanism for an automotive vehicle, the combination of a drive shaft, a driven shaft, a hydrodynamic coupling device driven from said drive shaft, gearing for completing a drive from said hydrodynamic device to said driven shaft, means providing a direct drive between said shafts by-passing said hydrodynamic device and including a fluid pressure engaged friction clutch for completing the drive, a speed responsive governor, mechanism variable with changes in torque demand by the vehicle operator and means for applying fluid pressure to said clutch to engage it under the joint control of said governor and said torque demand variable mechanism.

36. In transmission mechanism for an automotive vehicle, the combination of a drive shaft, a driven shaft, a hydraulic torque converter driven from said drive shaft, gearing for completing a drive from said hydraulic torque converter to said driven shaft, means providing a direct drive between said shafts by-passing said hydraulic torque converter and including a fluid pressure engaged friction clutch for completing the drive, a governor responsive to the speed of said driven shaft, mechanism variable with changes in torque demand by the vehicle operator, a source of fluid pressure, and valve mechanism under the joint control of said governor and said torque demand variable mechanism to connect said pressure source with said clutch to engage the clutch when the speed of said driven shaft increases and the torque demand decreases.

37. In transmission mechanism for an automotive vehicle, the combination of a drive shaft, a driven shaft, an intermediate shaft, a hydrodynamic coupling device driven from said drive shaft and driving said intermediate shaft, gearing between said intermediate and driven shafts for completing a drive between said drive and driven shafts through said hydrodynamic device and the gearing, a clutch for directly connecting said drive and intermediate shafts to by-pass said hydrodynamic device, a speed responsive governor means, mechanism variable with changes in torque demand by the vehicle operator, and means for engaging said clutch under the joint control of said governor means and said torque demand variable mechanism.

38. In transmission mechanism for an automotive vehicle, the combination of a drive shaft, a driven shaft, an intermediate shaft, a hydraulic torque converter driven from said drive shaft and driving said intermediate shaft, gearing between said intermediate and driven shafts for completing a drive through said torque converter and the gearing between said drive and driven shafts, a fluid pressure engaged friction clutch for connecting said drive and intermediate shafts for by-passing said torque converter, a source of fluid pressure, a governor responsive to the speed of said driven shaft, mechanism variable with changes in torque demand by the vehicle operator, and means under the joint control of said governor and said torque demand mechanism for connecting said pressure source and said clutch to engage the clutch when the speed of said driven shaft increases and the torque demand decreases.

39. In transmission mechanism for an automotive vehicle, the combination of a drive shaft, a driven shaft, a hydrodynamic coupling device driven from said drive shaft, gearing for completing a drive from said hydrodynamic device to said driven shaft, means providing a direct drive between said shafts by-passing said hydrodynamic device and including a fluid pressure engaged friction clutch for completing the drive, a speed responsive governor means, means variable with changes in torque demand by the vehicle operator, means for applying fluid pressure to said clutch to engage it under the joint control of said governor means and said torque demand variable means when the speed is increased and the torque demand is decreased, and means for disapplying fluid pressure to said clutch to disengage said clutch when said torque demand variable mechanism is moved past open position and the torque demand is increased.

40. In transmission mechanism for an automotive vehicle, the combination of a drive shaft, a driven shaft, a hydraulic torque converter driven from said drive shaft, gearing for completing a drive from said torque converter to said driven shaft, means providing a direct drive between said shafts by-passing said torque converter and including a fluid pressure engaged friction clutch for completing the drive, a source of fluid pressure, governor means responsive to the speed of said driven shaft, mechanism variable with changes in torque demand by the vehicle operator, valve mechanism under the joint control of said governor means and said torque demand variable mechanism for connecting said pressure source with said clutch for engaging the clutch when the speed of said driven shaft increases and the torque demand is decreased, an accelerator for the vehicle, and means under the control of said accelerator and effective on said valve mechanism for disconnecting said pressure source and said clutch to cause disengagement of the clutch when the accelerator is moved in an operative stroke past the open throttle position.

41. In transmission mechanism for an automotive vehicle, the combination of a drive shaft, a driven shaft, an intermediate shaft, a hydraulic torque converter driven from said drive shaft and driving said intermediate shaft, gearing driven from said intermediate shaft and driving said driven shaft for completing a drive between said drive and driven shafts through said torque converter and the gearing, a fluid pressure engaged friction clutch for connecting said drive and intermediate shafts for by-passing the hydraulic torque converter, a governor responsive to the speed of said driven shaft, mechanism variable with changes in torque demand by the vehicle operator, a source of fluid pressure, and valve means under the joint control of said governor and said torque demand variable mechanism for connecting said pressure source and said clutch for engaging the clutch when the driven shaft speed increases and the torque demand decreases, an accelerator for the vehicle, and means under the control of said accelerator and effective on said valve means to block said clutch with respect to said pressure source and cause disengagement of said clutch when the accelerator is moved in an operative stroke past the open throttle position.

42. In transmission mechanism for an automotive vehicle, the combination of a drive shaft, a driven shaft, a hydrodynamic coupling device driven from said drive shaft, planetary gearing for completing a first speed drive from said hydrodynamic device to said driven shaft, a clutch for locking together two elements of said gearing for providing a second speed drive between said shafts through said hydrodynamic coupling device, means for providing a direct drive between said shafts by-passing said hydrodynamic device and including a second clutch for completing the drive, a speed responsive governor, mechanism variable with changes in torque demand by the vehicle operator, and means for engaging each of said clutches under the joint control of said governor and said torque demand variable mechanism.

43. In transmission mechanism for an automotive vehicle, the combination of a drive shaft, a driven shaft, a hydraulic torque converter driven from said drive shaft, planetary gearing for completing a low speed drive from said hydraulic torque converter to said driven shaft, a first fluid pressure engaged friction clutch for locking together two elements of said gearing so as to provide an intermediate speed drive between said shafts through said torque converter, means providing a direct drive between said shafts by-passing said torque converter and including a second fluid pressure engaged friction clutch for completing the drive, a source of fluid pressure, a governor driven by said driven shaft, mechanism variable with changes in torque demand by the vehicle operator, and valve means under the joint control of said governor and said torque demand mechanism for connecting said pressure source with each of said clutches as the speed of said driven shaft increases and said torque demand decreases.

44. In transmission mechanism for an automotive vehicle, the combination of a drive shaft, a driven shaft, a hydraulic torque converter driven from said drive shaft, planetary gearing for completing a low speed drive between said shafts through said torque converter, a first friction clutch for locking together two elements of said gearing for providing an intermediate speed drive between said shafts through said converter, means providing a direct drive between said shafts by-passing said torque converter and including a second friction clutch for completing the drive, a governor driven by said driven shaft, mechanism variable with changes in torque demand by the vehicle operator, means under the joint control of said governor and said torque demand mechanism for engaging each of said clutches when the driven shaft speed increases and the torque demand decreases, an accelerator for the vehicle, and means under the control of said accelerator for disengaging said clutches when the accelerator is moved in an operative stroke past the open throttle position.

45. In transmission mechanism for an automotive vehicle, the combination of a drive shaft, a driven shaft, an intermediate shaft, a hydraulic torque converter driven from said drive shaft and driving said intermediate shaft, gearing effectively between said intermediate and driven shafts for completing a low speed drive between said drive and driven shafts including said torque converter, a first fluid pressure engaged friction clutch for connecting together two elements of said gearing to provide an intermediate speed drive between said shafts through said torque converter, means providing a direct drive between said drive and driven shafts by-passing said torque converter including a second fluid pressure engaged friction clutch for connecting said drive and intermediate shafts and completing the direct drive when engaged with said first clutch, a governor responsive to the speed of said driven shaft, mechanism variable with changes in torque demand by the vehicle operator, a source of fluid pressure, means under the joint control of said governor and said torque demand mechanism for connecting said pressure source with each of said clutches for engaging each of them when the speed of said driven shaft increases and said torque demand decreases, an accelerator for the vehicle, and means for simultaneously disconnecting said pressure source and both of said clutches and for simultaneously disengaging both clutches when the accelerator is moved in an operative stroke past the open throttle position.

46. In transmission mechanism for an automotive vehicle, the combination of a drive shaft, a driven shaft, a hydraulic torque converter driven from said drive shaft, planetary gearing for completing a first speed drive between said shafts including said torque converter, a clutch for locking together two elements of said gearing to provide a second speed drive between said shafts including said hydraulic torque converter, means for providing a direct drive between said shafts by-passing said torque converter and including a second clutch for completing the drive, and means for controlling engagement of said clutches and including means responsive to the speed of the vehicle effective with respect to one of the clutches at a predetermined low speed of the vehicle and effective with respect to the other of said clutches at a higher predetermined speed of the vehicle.

47. In transmission mechanism for an automotive vehicle, the combination of a drive shaft, a driven shaft, a hydraulic torque converter driven from said drive shaft, planetary gearing for completing a first speed drive between said shafts including said torque converter, a clutch for locking together two elements of said gearing to provide a second speed drive between said shafts including said hydraulic torque converter, a fluid pressure engaged friction clutch for locking together two elements of said gearing to provide a second speed drive between said shafts including said hydraulic torque converter, means for providing a direct drive between said shafts by-passing said torque converter and including a second fluid pressure engaged friction clutch for completing the drive, a source of fluid pressure, valve means for connecting said pressure source and said clutches, and means for controlling said valve means and including means responsive to the speed of the vehicle effective to control the valve means with respect to one of said clutches at a certain predetermined low speed of the vehicle and effective to control the valve means with respect to the other of said clutches at a higher predetermined speed of the vehicle.

48. In transmission mechanism for an automotive vehicle, the combination of a drive shaft, a driven shaft, an accelerator for the vehicle, a hydraulic torque converter driven from said drive shaft, planetary gearing for completing a first speed drive between said shafts including said torque converter, a clutch for locking together two elements of said gearing to provide a second speed drive between said shafts including said hydraulic torque converter, means for providing a direct drive between said shafts by-passing said torque converter and including a second clutch for completing the drive, means for controlling engagement of said clutches and including means responsive to the speed of the vehicle effective with respect to one of the clutches at a predetermined low speed of the vehicle and effective with respect to the other of said clutches a higher predetermined speed of the vehicle, and means under the control of said accelerator for causing disengagement of one of said clutches when the accelerator is moved in an operative stroke past the open throttle position.

49. In transmission mechanism for an automotive vehicle, the combination of a drive shaft, a driven shaft, mechanism variable with changes in torque demand by the vehicle operator, a hydraulic torque converter driven from said drive shaft, planetary gearing for completing a first speed drive between said shafts including said torque converter, a clutch for locking together two elements of said gearing to provide a second speed drive between said shafts including said hydraulic torque converter, means for providing a direct drive between said shafts by-passing said torque converter and including a second clutch for completing the drive, means for controlling engagement of said clutches and including means responsive to the speed of the vehicle effective with respect to one of the clutches at a predetermined low speed of the vehicle and effective with respect to the other of said clutches a higher predetermined speed of the vehicle, and means responsive to said torque demand variable mechanism for modifying the action of said speed responsive means with respect to one of said clutches to cause engagement of the clutch when the torque demand decreases.

50. In transmission mechanism for an automotive vehicle, the combination of a drive shaft, a driven shaft, a hydrodynamic coupling device driven from said drive shaft, gearing for completing a drive from said hydrodynamic device to said driven shaft, means providing a direct drive between said shafts by-passing said hydrodynamic device and including a clutch for completing the drive, a governor responsive to the speed of the vehicle, mechanism variable with changes in torque demand by the vehicle operator, means under the control of said torque demand mechanism for engaging said clutch when the torque demand is decreased, and means under the control of said governor for rendering said torque demand mechanism so effective above a predetermined vehicle speed and ineffective below said predetermined vehicle speed and causing engagement of said clutch regardless of torque demand at a predetermined higher vehicle speed.

51. In transmission mechanism for an automotive vehicle, the combination of a drive shaft, a driven shaft, a hydraulic torque converter driven from said drive shaft, gearing for completing a drive from said hydraulic torque converter to said driven shaft, means providing a direct drive between said shafts by-passing said torque converter and including a friction clutch for completing the drive, mechanism responsive to the speed of the vehicle, means responsive to the torque demand by the vehicle operator, means for engaging said clutch under the joint control of said speed responsive mechanism and said torque demand mechanism when the vehicle is travelling above a predetermined speed and the torque demand decreases, an accelerator for the vehicle, and means under the control of said accelerator on an operative stroke thereof past the open throttle position for disengaging said clutch, said speed responsive mechanism being operative above a higher predetermined speed of the vehicle for engaging said clutch regardless of movement of the accelerator past its said open throttle position.

52. In transmission mechanism for an automotive vehicle, the combination of a drive shaft, a driven shaft, a hydraulic torque converter driven from said drive shaft, planetary gearing for completing a first drive between said shafts including said torque converter, a clutch for locking together two elements of said gearing for providing a second drive between said shafts through said torque converter, means for providing a direct drive between said shafts by-passing said torque converter and including a second clutch for completing the drive, means responsive to the speed of the vehicle, mechanism variable with changes in torque demand by the vehicle operator, means for engaging each of said clutches under the control of said torque demand variable mechanism when the torque demand is decreased, and means under the control of said speed responsive mechanism for preventing such clutch engagement below a predetermined vehicle speed and overruling the torque demand mechanism with respect to said direct drive clutch to engage the clutch above a higher predetermined vehicle speed.

53. In transmission mechanism for an automotive vehicle, the combination of a drive shaft, a driven shaft, a hydraulic torque converter driven from said drive shaft, a planetary gearing for completing a first drive from said torque converter to said driven shaft and including a one-way brake mechanism for taking the reaction of the gearing to complete the drive, a clutch for locking together two elements of said gearing for providing a second drive between said shafts through said torque converter, means for providing a direct drive between said shafts by-passing said torque converter and including a second clutch for completing the drive, a speed responsive governor, and means for engaging each of said clutches under the control of said governor.

54. A transmission comprising driving and driven shafts, a hydraulic torque converter driven from said drive shaft, planetary gearing having a plurality of elements and connected to drive said driven shaft from said torque converter, means including a one-way brake for braking one of the elements of said gearing for completing the drive between said torque converter and driven shaft, a friction clutch for locking together two elements of said gearing so as to provide a direct drive between said torque converter and said driven shaft with said one-way brake overrunning, means providing a direct drive between said driving and driven shafts by-passing said torque converter and including a friction clutch for completing the drive.

55. A transmission comprising a driving shaft, a driven shaft, an intermediate shaft, a hydraulic torque converter driven from said drive shaft and driving said intermediate shaft, planetary gearing driven from said intermediate shaft and driving said driven shaft, braking mechanism including a one-way brake for braking an element of said gearing so as to complete a reduced speed drive between said driving and driven shafts including said torque converter and said gearing, a friction clutch for connecting together two elements of said gearing so as to lock up the gearing to provide a higher speed drive between said driving and driven shafts with said one-way brake overrunning, and a second friction clutch for directly connecting said driving and intermediate shafts so as to provide a drive between said driving and driven shafts exclusive of said torque converter.

56. In transmission mechanism, the combination of a drive shaft, a driven shaft, means providing a power train between said shafts including a hydraulic torque converter, said torque converter having a plurality of elements with blades adapted to co-act with a fluid and having a housing for the fluid, means for providing an alternate power train between said shafts exclusive of said torque converter and including a friction clutch in said housing, said clutch comprising a clutch applying piston exposed to fluid pressure in said housing, means for regulating fluid in said housing to a low pressure, and means for supplying fluid under pressure behind said piston at a higher pressure so that the piston may move against the pressure within said housing to engage said clutch.

57. In transmission mechanism, the combination of a drive shaft, a driven shaft, means providing a power train between said shafts including a hydraulic torque converter, said torque converter having a plurality of elements with blades adapted to co-act with a fluid and having a housing for the fluid, means for providing an alternate power train between said shafts exclusive of said torque converter and including a friction clutch in said housing, said clutch comprising a clutch applying piston exposed to fluid pressure in said housing, means including a regulating valve for regulating the fluid in said housing to a predetermined low pressure, and means including a second regulating valve for supplying fluid under pressure behind said piston at a higher pressure so that the piston may move against the pressure within said housing to engage said clutch.

58. In transmission mechanism, the combination of a drive shaft, a driven shaft, means providing a power train between said shafts including a hydraulic torque converter, said torque converter having a plurality of elements with blades adapted to co-act with a fluid and having a housing for the fluid, means for providing an alternate power train between said shafts exclusive of said torque converter and including a friction clutch in said housing, said clutch comprising a clutch applying piston exposed to fluid pressure in said housing, a pump connected to supply fluid to said housing and also behind said piston so that the piston may move to engage said clutch, a regulating valve for maintaining the fluid supplied to said piston at a predetermined high pressure, and a second regulating valve for regulating the fluid within said housing at a predetermined low pressure so that the piston may move against the pressure within said housing.

59. In transmission mechanism, the combination of a drive shaft, a driven shaft, means providing a power train between said shafts including a hydraulic torque converter, said torque converter having a plurality of elements with blades adapted to co-act with a fluid and having a housing for the fluid, means for providing an alternate power train between said shafts exclusive of said torque converter and including a friction clutch in said housing, said clutch comprising a clutch applying piston exposed to fluid pressure in said housing, a source of fluid pressure including a pump connected with said housing to supply fluid thereto, selector valve means for connecting said pressure source with said piston so as to apply fluid pressure behind said piston to move the piston to engage said clutch, a first regulator valve for regulating the fluid supplied to said clutch at a predetermined high pressure, and a second regulator valve for regulating the fluid supplied to said housing to a predetermined low pressure so that the piston may move against the fluid pressure in said housing.

60. In transmission mechanism, the combination of a drive shaft, a driven shaft, means providing a power train between said shafts including a hydraulic torque converter, said torque converter having a plurality of elements with blades adapted to co-act with a fluid and having a housing for the fluid, means for providing an alternate power train between said shafts exclusive of said torque converter and including a friction clutch in said housing, said clutch comprising a clutch applying piston exposed to fluid pressure in said housing, a source of fluid pressure including a pump which is connected to supply fluid to said housing, selector valve means for selectively connecting said pump with said piston to apply fluid pressure behind the piston to move the piston to engage said clutch, a regulator valve for regulating the fluid pressure applied to said piston from said selector valve means at a predetermined high pressure, a second regulator valve for maintaining the fluid pressure within said housing while the torque converter is driving to a predetermined low value so that a differential of pressures applied on opposite sides of said piston exists, and additional pressure means for raising the differential of pressures applied to said piston when said clutch is engaged.

References Cited in the file of this patent

UNITED STATES PATENTS

| | | |
|---|---|---|
| 1,967,730 | Zadig | July 24, 1934 |
| 2,105,429 | Maybach | Jan. 11, 1938 |
| 2,120,104 | Livermore | June 7, 1938 |
| 2,226,802 | Black | Dec. 31, 1940 |
| 2,351,213 | James | June 13, 1944 |
| 2,380,677 | Schjolin | July 31, 1945 |
| 2,456,328 | Schneider | Dec. 14, 1948 |